Nov. 17, 1953 — W. P. C. SMITH — 2,659,516
LIQUID DISPENSER
Filed May 25, 1949
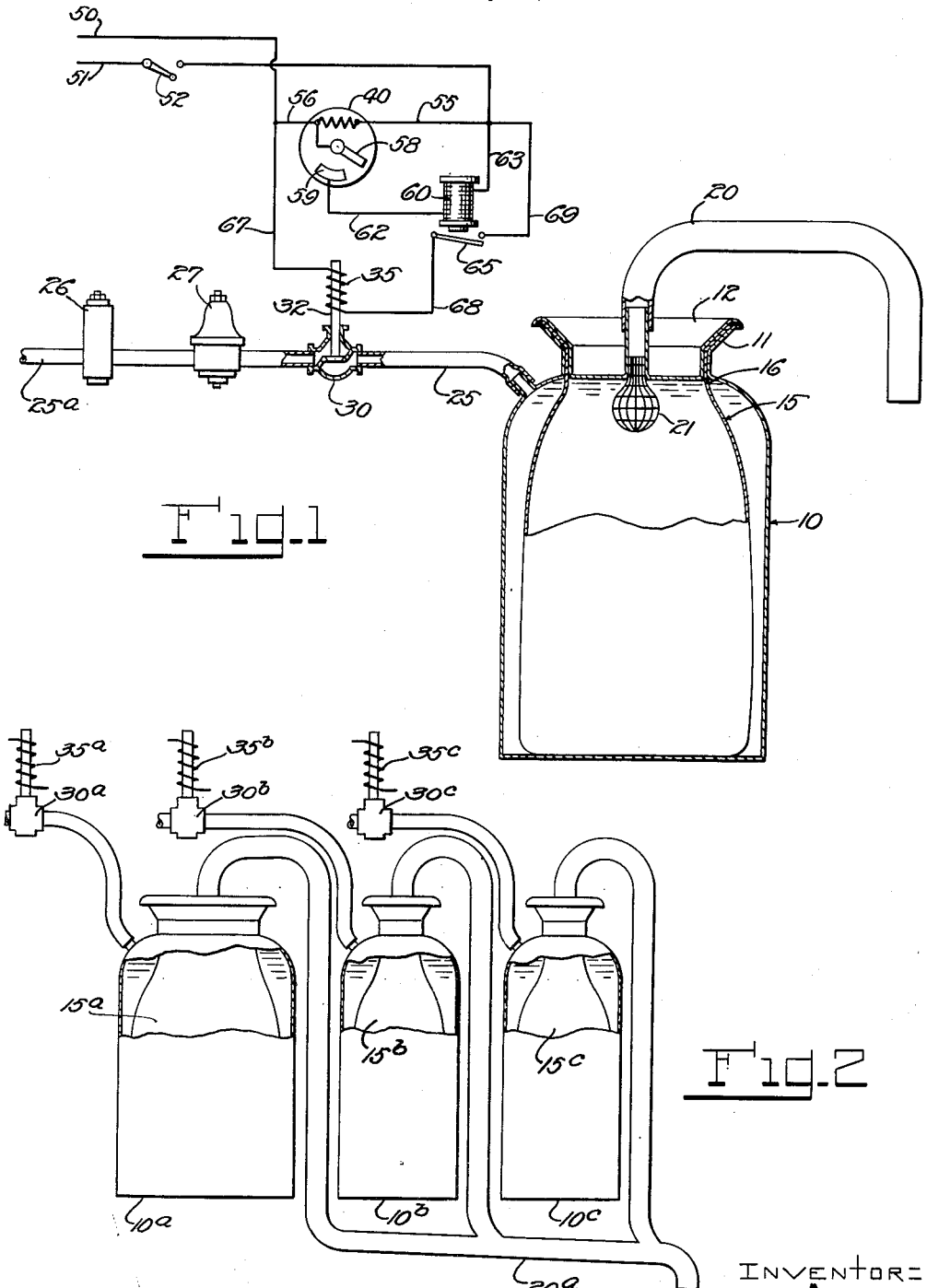

Patented Nov. 17, 1953

2,659,516

UNITED STATES PATENT OFFICE 2,659,516

LIQUID DISPENSER

William P. C. Smith, Rockport, Mass.

Application May 25, 1949, Serial No. 95,303

4 Claims. (Cl. 222—70)

This invention relates to a liquid dispenser and particularly to a dispenser in which liquids from one or more containers can be dispensed automatically in precisely measured successively equal amounts and in which the liquids dispensed do not pass through valves.

There are many requirements for mechanism to dispense one or more liquids in precisely measured successively equal amounts in which the exact amount of liquid or liquids required may be drawn from the container or containers automatically when the dispensing operation has been initiated. Examples are the chemical industry where it is frequently required to draw several liquid ingredients in measured amounts quickly into a receptacle and the liquid food dispensing industry where, for instance, in a public coffee vending machine a customer can, by dropping a coin into the dispenser, initiate operations whereby measured amounts of hot water, concentrated coffee, cream and liquid sugar may be drawn off into a drinking cup. Particularly in the case of liquid food dispensing machines which are usually under the jurisdiction of public health laws, it is required that the liquid organic matter comprising the food ingredients be dispensed directly through pipes without passing through moving parts such as valves, because of the danger of contamination through accumulation of organic matter in such valves and moving parts which are difficult to keep clean.

Accordingly, it is an object of the invention to provide apparatus for dispensing liquid from one or more containers in accurately measured successively equal amounts automatically and in which the liquid dispensed does not pass through mechanical moving parts particularly metal parts, such as valves and pumps.

According to my present invention the liquid to be dispensed is contained in a closed flexible bag having a discharge line and which in turn is submerged in liquid in a closed container. Automatic addition of liquid under pressure surrounding the bag in predetermined successive amounts progressively deflates the bag and displaces the liquid in the amounts desired through the discharge line.

In the drawings of the example of apparatus described herein which is illustrative of my invention, and not intended to limit its scope beyond the requirements of the prior art:

Fig. 1 is a side elevation view, partly in section, of apparatus for dispensing milk, together with a wiring diagram, and Fig. 2 is a side view of multiple apparatus for dispensing liquids from several containers into a common discharge pipe.

In the drawings, Fig. 1 is shown as an apparatus which can be used for dispensing cups of milk to an ultimate consumer. It comprises a liquid container 10 which is shown to be of a type similar to the usual five gallon commercial delivery milk can having a flaring neck 11 forming an opening and a cover 12 which fits down into the opening in the neck 11. A flexible bag 15 for containing the liquid to be dispensed, in this case milk, has a neck portion 16 forming its opening and which is adapted to be seated and sealed off between the neck portion 11 and the cover 12 of the container 10. The bag 15 may be made of any suitable liquidproof flexible material, such as rubber, neoprene or one of the flexible synthetic resins. A liquid discharge pipe 20 is connected at the top to the interior of the bag 15 through the cover 12, and a bulbous cage or screen 21 extends from the discharge pipe 20 down into the space within the bag 15 for a purpose to be described.

Means are provided for admitting fluid under pressure into the container 10 externally of the bag 15 comprising a fluid pressure inlet line 25 which may be conveniently tapped from an ordinary municipal water supply line 25a through a shut-off valve and strainer 26 and a pressure reduction and adjustment valve 27. A fluid pressure shut-off control valve 30 in the line 25 is adapted to operate by opening and closing at predetermined points to admit fluid under pressure, in this case water, through the line 25 and into the container 10. For this purpose the plunger 32 of the valve 30 is raised to open the valve by a solenoid 35 which in turn is energized and controlled by a timer 40 connected to an electric power supply, which for convenience may be an ordinary 110 volt house system, through the wires 50 and 51 and a switch 52 of any convenient type. In a public dispensing system the switch 52 may be coin operated.

When the switch 52 is closed, the timer 40 is energized by closing of a circuit through it across the wires 50 and 51 through the connecting wires 55 and 56. A rotating arm 58 in the timer 40 makes contact with a plate 59 establishing a circuit through and energizing a relay 60 between the power lines 50 and 51 through the wires 56, 62 and 63, closing a relay switch 65 in a circuit through the solenoid 35 between the power lines 50 and 51 by way of the wires 67, 68 and 69. The timer 40 is preset so that its rotating arm 58 is in contact with the plate 59 for a predetermined time during which the solenoid 35 is energized and the valve 30 is open admitting fluid under pressure through the line 25 into the container 10. Each time the switch 52 is closed, the bag 15 is deflated to the extent that liquid is admitted to the container 10 and milk is displaced through the pipe 20 at the top of the container 10 and bag 15.

As the bag 15 becomes nearly empty of liquid after successive operation its upper part near the neck 16 may collapse prematurely and seal off undispensed liquid remaining in the lower part. To prevent this the screen or cage 21 may be provided to prevent complete premature collapse of the upper part of the bag so that all of the liquid contained therein will eventually be dispensed upon complete deflation of the bag 15.

In Fig. 2 is illustrated a combination of several units of the same apparatus designated 10a, 10b and 10c each of which may contain a different liquid which may be dispensed into a common discharge pipe 20a and adapted, for instance, as in the apparatus described in my above mentioned application Ser. No. 37,706 for dispensing the several ingredients necessary to make a cup of coffee. Each unit 10a, 10b and 10c has a separate control valve 30a, 30b and 30c operated by a solenoid 35a, 35b and 35c respectively. The solenoids 35a, 35b and 35c are controlled by individual timers (not shown) which may be individually pre-set to dispense the desired amount of liquid from each of the separate units and controlled by a common operating switch (not shown).

One big advantage of the present form of the invention is its adaptation in connection with modern developments in plastic flexible containers which are suitable for use as liquid food containing bags 15.

These bags are made at sterilizing temperatures and heat sealed, making the interiors of the bags sanitary. They may be shipped to the food processor, for instance the dairyman, who unseals the bags, places them in the milk cans, fills them with milk and seals them off with the covers 12, all under sanitary conditions. The milk in the bags 15, encased in the containers 10, is then delivered to the dispensing machines of the invention. The fluid pressure line 25 and discharge pipe 20 are connected and the machine is ready for use.

I claim:

1. A device for dispensing liquid in predetermined amounts comprising a closed container, a flexible bag in said container having a liquid discharge line connected from its top, a supply line connected to said container externally of said bag and supplying fluid under controlled constant pressure to said container, a control valve in said supply line, means to open said valve, said valve opening means including automatic timing mechanism operating to hold said valve open for a predetermined period and then to close it, the fluid under pressure in said supply line thereby operating to deflate said bag and to discharge liquid from it in successively equal increments predetermined by the volume of liquid passing said control valve when the latter is open.

2. A device for dispensing liquid in predetermined amounts comprising a closed container, a flexible bag in said container having a liquid discharge line connected from its top, a supply line connected to said container externally of said bag supplying fluid under pressure to said container, a control valve and said supply line, power means to open said valve, said power means including timing mechanism operating to hold said valve open for a predetermined period and then to close it, the fluid under pressure in said supply line thereby operating to deflate said bag and to discharge liquid from it in successively equal increments.

3. A device for dispensing liquid in predetermined amounts comprising a closed container, a flexible bag in said container having a liquid discharge line connected from its top, means to admit fluid under pressure into said container externally of said bag including a control valve, power mechanism to open said valve, said power mechanism including timing mechanism operating to close said valve at a predetermined time after it has been opened, said bag being thereby deflated and discharging liquid in an amount equal to the volume of fluid passing said control valve.

4. In a device for dispensing liquids, in combination, a closed container having a neck portion, a cover for said container having a discharge line, said cover being seated in said neck portion, a flexible bag in said container, said bag having a neck portion disposed between the neck portion of the container and the cover and thereby forming a leak proof seal, a fluid pressure supply line having a control valve connected to said container externally of said bag, power mechanism to open said valve, said power mechanism including timing mechanism operating to close said valve at a predetermined time after it has been opened, said bag being thereby deflated and discharging liquid in an amount equal to the volume of fluid passing said control valve.

WILLIAM P. C. SMITH.

References Cited in the file of this patent

UNITED STATES PATENTS

| Number | Name | Date |
|---|---|---|
| 1,078,028 | Zeamans | Nov. 11, 1913 |
| 1,639,679 | Zsoldos | Aug. 23, 1927 |
| 1,939,611 | Purvis | Dec. 12, 1933 |
| 2,109,549 | Piquerez | Mar. 1, 1938 |
| 2,177,032 | Baumgardner | Oct. 24, 1939 |
| 2,381,304 | Merrill | Aug. 7, 1945 |
| 2,440,365 | Copping et al. | Apr. 27, 1948 |
| 2,505,798 | Skinner | May 2, 1950 |
| 2,533,428 | Carpenter | Dec. 2, 1950 |